March 19, 1957 — R. C. MANINGER — 2,786,145
COMPOUND DETECTOR
Filed Oct. 10, 1952

INVENTOR.
RALPH CARROLL MANINGER
BY
ATTORNEYS

2,786,145

COMPOUND DETECTOR

Ralph Carroll Maninger, Montvale, N. J., assignor to Vitro Corporation of America, New York, N. Y., a corporation of Delaware Application October 10, 1952, Serial No. 314,123

2 Claims. (Cl. 250—83.3)

My invention relates to radiation-responsive devices, and in particular to a detector construction facilitating the discrimination of alpha and beta radiation in the presence of a gamma field.

It is an object of the invention to provide an improved construction of the character indicated.

It is another object to provide in a unitary construction twin radiation-responsive cells with a radiation barrier therebetween.

A further object is to provide depolarizing means for improving the response of cells of the character indicated.

It is a general object to meet the above objects with a rugged mechanical construction, withstanding mechanical vibration, and not requiring special care in handling; and featuring in addition complete water-proofing (to insure uniform electrical performance), ready replacement (as in the event of a defective crystal), and adaptability to mass production.

Other objects and various further features of novelty and invention will be pointed out or will become apparent to those skilled in the art from a reading of the following specification in conjunction with the accompanying drawings. In said drawings, which show, for illustrative purposes only, preferred forms of the invention:

Briefly stated, my invention contemplates a radiation-responsive detector unit comprising two matched radiation-responsive cells oriented in spaced relation and with their predominant responses symmetrically disposed with respect to barrier means between the two cells. In the case of light-polarizing cells, response may be improved by providing means for the accommodation of substantially only depolarizing light in the wave band appropriate to the cells employed; such means may be accommodated in the body of the barrier, as a further inherent function of the barrier itself. In the forms to be described, the cells include cadmium-sulphide crystals, and means are provided for bathing the crystals in depolarizing light in a restricted wave band including substantially 5200-angstrom light.

Figure 1:
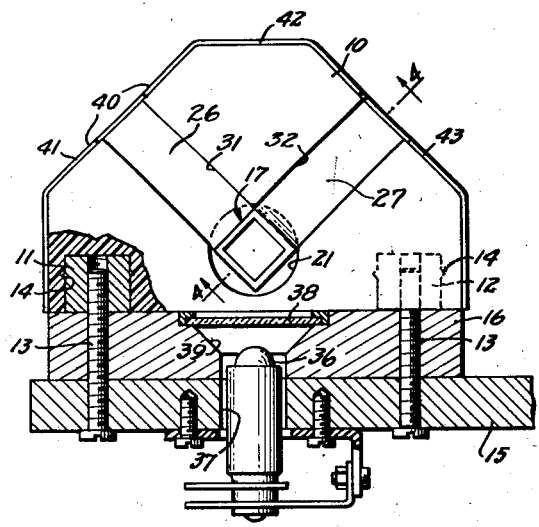
Fig. 1 is a plan view of a detector unit incorporating features of the invention, and shown partly broken away and in section and mounted for operation.
Figure 2:
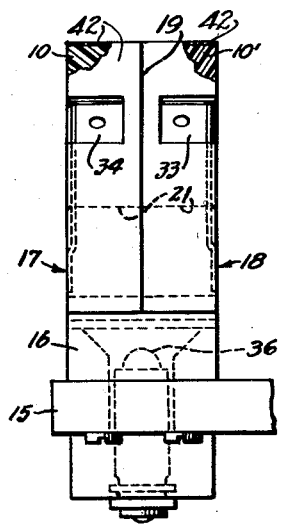
Fig. 2 is a right-end view of the assembly of Fig. 1.

Referring to Figs. 1 and 2 of the drawings, my invention is shown in application to a detector unit comprising base means 10 of plastic construction. The base 10 is preferably prismatic and may comprise opposed plane surfaces including the surface appearing in full in Fig. 1. Mounting means, such as metallic blocks 11—12, may be threaded to receive mounting screws 13 and may be locally roughened at 14 for secure retention when cast in the body 10. The detector block 10 is shown secured to a frame member 15 and spaced therefrom by spacer means 16.

The base 10 may serve the function of supporting two like cells 17—18 in spaced relation and symmetrically about a central plane of symmetry, as denoted by the heavy line 19 in Fig. 2. For convenience in assembly, the base 10 may be in one piece, spanning the full width of the detector and accommodating both cells 17—18, the thickness of plastic being sufficient to provide the desired radiation attenuation, so as to provide effective shielding of one of the cells (18) from directional radiation predominantly incident upon the other (17) of the cells. Alternatively, and as in the form shown, the base 10 may comprise two like blocks 10—10', each of which separately accommodates one of the cells. The latter construction will be seen to permit insertion of a radiation barrier or sheath between the two base blocks 10—10' and, therefore, improved attenuation between the two cells for a given over-all width of the detector unit. For shielding against alpha and beta radiation, a relatively thin lead barrier may suffice, and the reference number 19 will be understood to designate such barrier.

For a purpose which will be made more clear, each of base blocks may include a bore 21 at least open to the outer surface of the base blocks 10—10' and uniformly encompassing one of the cells 17—18. The bores 21 happen to be formed continuously through each of the base blocks 10—10' but, of course, not through any additional barrier means 19 which may be employed.

Figures 3, 4:
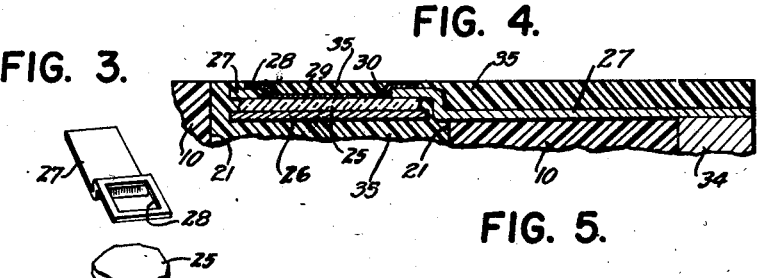
Fig. 3 is an exploded view in perspective of parts utilized in an element of the construction of Figs. 1 and 2.
Fig. 4 is an enlarged fragmentary sectional view taken substantially in the plane 4—4 of Fig. 1.

Each of the cell units may comprise a radiation-responsive photoelectric crystal 25 (see Figures 3 and 4) of uniform thickness and having opposed plane surfaces. I prefer to employ cadmium-sulphide crystals, but crystals of zinc sulphide, or of the selenides of these metals, will also exhibit the desired responses. Electrical connections may be made through electrodes 26—27 having mutually overlapping areas on the opposed surfaces of the crystal 25. Both electrodes 26—27 may be of shim brass and cemented to the crystal, preferably in intimate electrically conductive contact therewith; and in the form shown the lead portions of these electrodes extend in different directions away from the crystal 25 in order to simplify connection of the device to an electrical circuit.

In spite of the thin proportions of the electrode material, I prefer to improve the response of the cells (17—18) predominantly to one side thereof by providing an enlarged opening or window 28 within the plate area of one (27) of the electrodes. Intimate electric contact over the full window area of the crystal may be made by having the electrode additionally include an extremely thin conductive layer 29 transparent to the desired radiation and contacting, as by overlapping, the adjacent edges of the electrode 27. I have found that the layer 29 may be made by vacuum-coating aluminum directly on the exposed surface of crystal 25, and that by providing a small fillet, as at 30, at all corners of window 28 when adjacent to cell 25, the layer 29 may be more uniformly and more ruggedly applied. The fillet 30 may comprise merely the excess cement squeezed out from the edges of the window 28 when electrode 27 is first applied to crystal 25, and the fillet may be rounded by wiping this excess toward all window edges.

I find it convenient to assemble the electrodes 26—27 to the crystal 25 as a separate operation prior to incorporation in the blocks 10—10', and for assurance of uniform electrical performance I prefer that all active conductive and other surfaces of the cell unit be hermetically sealed when mounted within the base blocks 10—10'. Hermetic sealing may be effected by spraying the cell assembly 25—26—27 with a suitably transparent plastic before mounting in the base block 10, but in the form shown in Fig. 3 the basic cell is applied directly to the block 10 and hermetically sealed thereafter.

In order to accommodate the electrodes 26—27 and the crystal 25 for complete hermetic sealing, I prefer that the block 10 shall include recesses or grooves 31—32 to receive the lead portions of the electrodes 26—27, respectively. The recesses or grooves 31—32 may extend from the bore 21 in different directions to the edge or outer limit of the base 10, and to provide a rugged means for removably establishing electrical contact of the electrodes 26—27 to an external circuit, I prefer to cast conductive blocks 33—34 within the body of the base 10 and at the outer limits of the recesses or grooves 31—32. When the cell unit is inserted in the block 10, the lead portions of electrodes 26—27 may be soldered or otherwise permanently electrically connected to the terminal blocks 33—34.

After thus mounting the cell in the base block, hermetic sealing and rugged mounting may be assured by potting, as by vacuum casting, the assembled portions to form a solid prism. The potting material, which may be the same material as that of the base 10, will then fill the bore 21 and both recesses or grooves 31—32. If desired, for extreme sensitivity, the outer opposed-plane surfaces of the cell block may be ground off so as to reduce the effective barrier thickness of potting material overstanding the active face of the crystal 25, for one or both of the cells 17—18. If the shim material constituting electrode 27 is sufficiently thin, then the outer face of the base 10 may be ground off until bare metal is just exposed, and the completed detector cell will remain hermetically sealed and subject to a minimum attenuation due to the presence of the thin layer of potting material which remains over the window opening. It will be appreciated that in Fig. 4 the proportions representing metal thicknesses have been greatly exaggerated in order to identify the parts, so that when the plastic is ground down to expose bare metal of shim 27 or of coating 29, there need be no impairment of electrical contact between coating 29 and electrode 27.

In accordance with another feature of the invention, my detector unit is rendered more radiation responsive by depolarizing the crystals of the cells 17—18. For crystals of the class indicated, a limited band of visible or near-visible light will produce the desired depolarizing effect, and for the case of cadmium-sulphide crystals, I have found wave-lengths substantially at 5200 Angstroms to be critical. In particular, I have found that desirable depolarizing effects may be achieved by subjecting the crystals substantially only to light in the wave band from 5100 to 5400 Angstroms. This result may be achieved by selecting a material for the base 10 having filtering characteristics defined by this band, but I prefer to employ an ordinary light-transparent plastic, such as Lucite, for the base 10 and also for the potting material used to fill the bore 21 and to hermetically seal the cell units. In order to subject the cells to the depolarizing light, I provide a light source 36 supported by the frame 15 and mounted within an aperture 37 in the base 15—16. The axis of the light source 36 is preferably in the central plane of symmetry of the detector, so that light therefrom may be available with complete symmetry at the edges of the base means 10—10' for both cells 17—18. Filtering means 38 having a pass band predominantly including 5200-Angstrom light may be mounted in the opening 37, and I prefer to flare the opening 37, as at 39, so that a relatively large-area filter 38 may be supported immediately adjacent the lower edges of the bases 10—10'.

Light other than in the indicated band has been found to have a polarizing effect on the crystals and, therefore, I prefer to shield the detector against such light. Such shielding may be effected by applying shield means 40 on all outwardly exposed edges of the base blocks 10. If the shielding means 40 is of a reflecting nature, as in the case of metallic foil, shielding may accomplish the further function of reflecting all depolarizing light predominantly toward the opening or openings 21 in which the cells are accommodated. I have shown formation of the blocks 10—10' with a plurality of edges 41—42—43 so that the utmost convergence of depolarizing light will be promoted upon reflection. The interface between the potting material within opening 21 and the inner wall of the opening 21 will provide scattering or diffusing means for such depolarizing light as is converged upon the interface. If this interface is roughened or if it is merely not polished, the scattering and diffusion will be adequately promoted, and the crystal will be uniformly bathed through the edge-lighted supply of depolarizing light. If desired, substantially all other visible light may be excluded by painting or otherwise enveloping the detector assembly with a suitably opaque material (not shown), all except for the active faces of the crystals.

Figure 5:
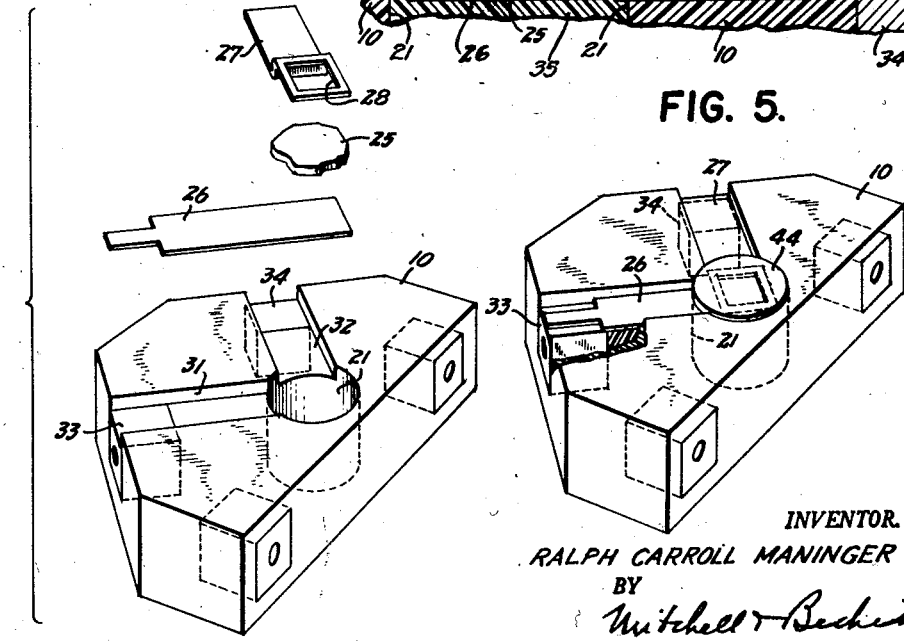
Fig. 5 is a perspective view illustrating an alternative construction for a part of the assembly of Fig. 1.

In Fig. 5 I have shown alternative means whereby hermetic sealing may be effected, and wherein the desired scattering and diffusion of depolarizing light around the crystal may also be promoted. In Fig. 5, the assembled cell, comprising crystal 25 and electrodes 26—27, is cast into a cylindrical plastic block 44 of a size to fit the bore 21 in the base 10; the outer face of this cylindrical block may be ground until the metal of electrode 27 is exposed, in order to reduce attenuation at the window of electrode 27. The block 44 may be externally roughened or merely not polished and may be then cemented in place or press-fitted in the base 10. The lead portions of the electrodes 26—27 will then have been left exposed, but since these are permanently connected to the terminal blocks 33—34, there are no undesirable effects if the grooves 31—32 are not thereafter potted.

It will be seen that I have described a basically simple detector assembly lending itself particularly to sensitive discrimination of alpha and beta radiation in the presence of an ambient gamma field. The construction is electrically constant due to rugged mechanical mounting and hermetic sealing of all sensitive parts. The construction lends itself to mass production and to simple replacement whenever necessary.

While I have described the invention in detail for the preferred forms shown, it will be understood that modifications may be made within the scope of invention as defined in the claims which follow.

I claim:

1. A radiation-responsive assembly comprising a prismatic base of plastic transparent to light radiation in the band from 5100 to 5400 Angstroms, and having an internal bore extending normal to and continuously between opposed parallel surfaces, a radiation-responsive cell supported by said base and predominantly at one end of said bore, and a potting of plastic transparent to light in said band and filling said bore, whereby the interface between said potting and the bore of said base will constitute diffusion means for circumferentially uniformly subjecting said cell to depolarizing light.

2. In a radiation-responsive device of the character indicated, a cadmium-sulphide crystal of substantially uniform thickness, two electrodes for said crystal, one of said electrodes being applied on one crystal face and substantially covering said face and being of a material and thickness substantially opaque to a given radiation, the other electrode being applied over the corresponding area of the other face and having a central opening, a conductive layer substantially transparent to said given radiation and intimately contacting a crystal area within said opening and in electrically conductive relation with said other electrode, a Lucite base having a bore with said crystal potted therein with the electrode opening facing out of said bore, a source of substantially 5200-Angstrom light directed at the edges of said crystal, and means for excluding other visible light from said crystal.

References Cited in the file of this patent

UNITED STATES PATENTS

| | | |
|---|---|---|
| 2,486,026 | Hills | Oct. 25, 1949 |
| 2,559,219 | Ludeman | July 3, 1951 |
| 2,566,349 | Mager | Sept. 4, 1951 |
| 2,604,596 | Ahern | July 22, 1952 |
| 2,666,145 | Eversole et al. | Jan. 12, 1954 |

OTHER REFERENCES

Radioactivity & Nuclear Physics, Cork, 1950, published by D. Van Nostrand Co. Inc., N. Y., pp. 59–61.

The Photo-Conductivity of "Incomplete Phosphors," Frerichs Physical Review, vol. 72, #7, Oct. 1, 1947, pp. 594–601.